3,440,401
THERMAL BREAKING MEANS FOR FRONT OF BAKING OVEN
Raymond L. Dills, Louisville, Ky., assignor to General Electric Company, a corporation of New York
Filed Aug. 30, 1967, Ser. No. 664,486
Int. Cl. F27d 11/00
U.S. Cl. 219—393                    8 Claims

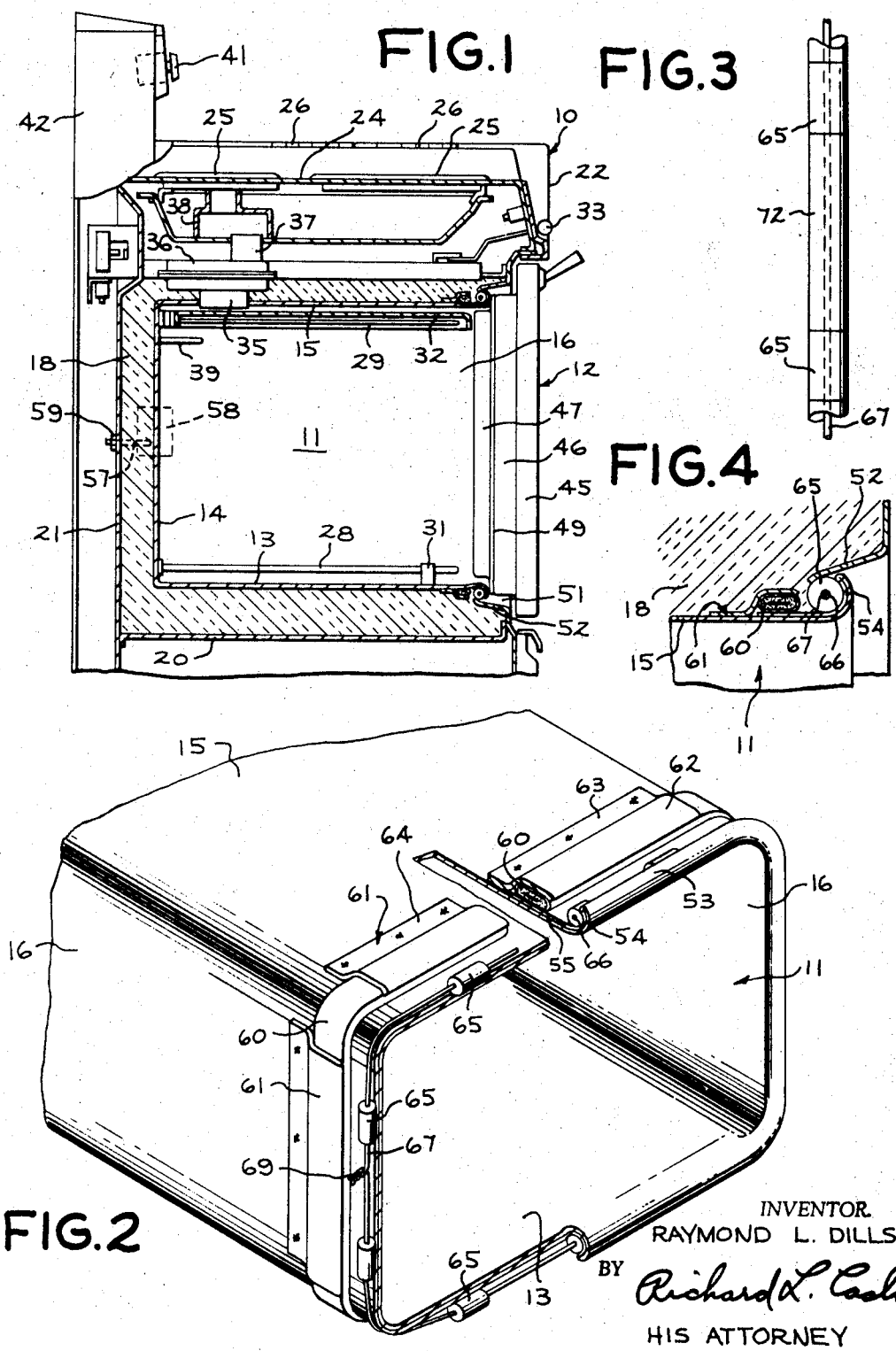
April 22, 1969  R. L. DILLS  3,440,401
THERMAL BREAKING MEANS FOR FRONT OF BAKING OVEN
Filed Aug. 30, 1967
INVENTOR.
RAYMOND L. DILLS
BY
HIS ATTORNEY

United States Patent Office 3,440,401
Patented Apr. 22, 1969

ABSTRACT OF THE DISCLOSURE

A thermal breaking means at the front of a baking oven to reduce the conduction of heat to the outside of the oven body. The oven has a cooking cavity formed by a box-like oven liner and a front-opening access door. In order to obtain generally uniform wall temperatures for the cooking cavity, especially during a high temperature self-cleaning cycle, it is well to replenish the heat lost through and around the door. Hence, there is provided an additional heating means adjacent the front of the oven. However, it is important to hold down the operating temperature of the front walls of the oven body so that they do not become uncomfortable to the human touch. The oven liner is mounted through a front opening in the oven body, and the oven liner is provided along its front edge with an outwardly turned flange that is opposed to the peripheral edge of the front opening of the oven body. The thermal breaking means comprises a plurality of widely separated ceramic spacers strung upon a tie member that is wrapped around and fastened behind the front flange of the oven liner. Sleeves are threaded onto the tie member between adjacent spacers, and these sleeves may either be of gasket material or of expendable plastic material.

Cross-reference to related patents

The present invention is a modification of the tension mounting means and mullion heater combination as is taught in the patent of J. K. Newell, Jr., No. 3,017,488, which is assigned to the General Electric Company, the assignee of the present invention. In the Newell invention, the mullion heater is sandwiched between a front flange of the oven liner and a rear flange of a separate breaker frame, and this breaker frame is in turn interposed between the mullion heater and a peripheral edge of a front opening in the oven body.

Background of the invention

This invention is related to self-cleaning ovens using a pyrolytic process at a high temperature range above normal cooking temperatures, between about 750° F. and about 950° F. as is disclosed and claimed in the patent of Bohdan Hurko, No. 3,121,158, which is likewise assigned to the assignee of the present invention. In such high temperature ovens it is best to maintain the oven wall temperatures at substantially uniform temperatures throughout so as to reduce the possibility of damage to the oven liner, and particularly the porcelain enamel finish thereon, due to thermal shock and high mechanical stresses. Heat tends to be dissipated through and around the oven door at a higher rate than at other areas of the oven. Hence, additional heat is supplied adjacent the front of the oven liner for replenishing the heat loss. However, it is important not to allow the external temperature of the oven front to become excessive so as to be uncomfortable to the human touch.

Objects of the invention

The principal object of the present invention is to provide an oven with a thermal breaking means between the front of the oven liner and the oven body where such means has high mechanical strength, high thermal shock resistance and a low coefficient of thermal expansion so as to hold down the maximum temperature of the front of the oven body.

A further object of the present invention is to provide an oven of the class described with thermal breaking means having a tie member combined with a plurality of ceramic spacers and separated by sleeve members for locating the spacers around the oven liner.

Summary of the invention

The present invention, in accordance with one form thereof, relates to an oven construction having an outer oven body, an oven liner and a front-opening access door as well as a thermal breaking means between the front of the oven liner and the front wall of the oven body. The thermal breaking means includes a plurality of widely separated ceramic spacers strung upon an endless tie member and located behind the front flange of the oven liner, said spacers are of a material having high mechanical strength, high thermal shock resistance and a low coefficient of thermal expansion.

Brief description of the drawing

My invention will be better understood for the following description taken in conjunction with the accompanying drawings, and its scope will be pointed out in the appended claims.

FIGURE 1 is a fragmentary left-side elevational view of an electric range having a self-cleaning oven embodying the present invention with some parts broken away and others in cross-section to show the principal features.

FIGURE 2 is a fragmentary perspective view showing the front of the oven liner with its front flange and the thermal breaking means located therebehind, as well as a mullion heater fastened around the front portion of the oven liner to furnish additional heat in this area of the oven.

FIGURE 3 is a fragmentary view of the thermal breaking means of the present invention showing the ceramic spacers separated by a sleeve where both the spacers and sleeves are strung upon a tie member that is adapted to be mounted behind the front flange of the oven liner and tied in place before the oven liner is inserted into the front opening of the oven body.

FIGURE 4 is a fragmentary cross-sectional view through the front edge of the oven liner.

Description of the preferred embodiment

Turning now to a consideration of the drawings and in particular to FIGURE 1 there is shown for illustrative purposes a free-standing electric range 10 having as its principal component a box-like oven liner 11 in combination with a front-opening access door 12 which together form an oven cooking cavity. The oven liner 11 is of sheet metal construction having a bottom wall 13, back wall 14, top wall 15, and opposite side walls 16, 16. The front of the oven liner 11 is open and it is adapted to be closed by the oven door 12 as is clearly illustrated.

A thick layer of thermal insulating material 18 such as fiber glass or the like completely surrounds the oven liner on all five sides and serves to retain the heat present in the oven cavity so as to render the system thermally efficient. A sheet metal insulation guard 20 is positioned beneath the oven liner for supporting the insulation, and three vertical panels 21 support the insulation, and three vertical panels 21 support the insulation at the two sides and back of the oven liner. The oven is further provided with an outer oven body 22 serving as the housing for the oven structure.

The oven of the present invention is shown as being built into a complete range having a top cooking surface or cooktop 24 assembled over the oven and including surface heating units 25 formed of metal sheathed resistance heating elements, as is conventional in this art. Each surface heating unit 25 is provided with a multiple push button selector switch 26 arranged along one of the side edges of the cooktop 24 for controlling the amount of wattage available in the heating circuit.

The oven cavity is provided with two main heating elements; namely, a lower baking element 28 and an upper boiling element 29. Each unit is in the form of a metal sheathed resistance heating element and it is bent into a large loop and provided with terminals which extend out through the back wall 14 of the oven liner for making electrical connections therewith. The baking element 28 is provided with a plurality of supporting clips or feet 31 for holding the baking element raised off of the bottom wall 13 of the oven liner so as not to develop hot spots that might otherwise damage the procelain enamel finish which covers the interior surface of the oven liner 11. The upper broiling element 29 is provided with a pan-shaped reflector 32 which overlies the broiling element and serves to direct the radiant energy from the element downwardly into the oven cavity, as well as to shield the upper wall 15 of the oven liner from the intense heat. As in standard baking and broiling ovens, the oven cavity will be provided with one or more wire racks that are adapted to be supported on rack-supporting embossments or ledges, but these are not illustrated in the drawings, for the sake of simplicity, since they do not form part of the present invention.

Other elements illustrated in the drawings, but which are more or less standard construction in self-cleaning ovens, will be mentioned here briefly for ease in understanding the environment in which the present invention is located. First, there is a door latch mechanism with a handle 33 which is used for locking the oven door 12 during the high temperature, heat cleaning of the oven walls. This is illustrated in detail in the patent of Clarence Getman 3,189,375 which is also assigned to the assignee of the present invention. Next, the oven cavity is provided with a venting system at the rear thereof having an exhaust duct in the top wall 15 of the oven liner so that the gaseous degradation products formed during a self-cleaning cycle may be exhausted to the outside of the oven and not allowed to condense on the oven walls. Interposed in this duct 35 is a catalytic oxidation unit 36 which serves both as a smoke and odor eliminator. There is an exhaust port 37 in the oxidation unit and it discharges into a labyrinth formed by duct work 38 which eventually discharges beneath one of the rear surface heating units 25 of the cooktop 24. One example of a satisfactory oxidation unit is disclosed in the patent of Stanley B. Welch, No. 2,900,483, which is assigned to the assignee of the present invention.

A standard oven temperature control comprises a temperature sensor such as a probe 39 which is mounted adjacent the top portion of the back wall 14 of the oven liner and would comprise a tubular member enclosing a wound nickel or platinum resistance wire (not shown) which is electrically connected to a remote temperature responder, shown diagrammatically in FIGURE 1 as element 41 as assembled in a control panel of a backsplasher 42 arranged along the rear edge of the cooktop 24.

Notice in FIGURE 1 that the oven door 12 may be broadly considered as having five main elements; namely, an outer door panel 45, an inner door panel 46, and an inner door liner 47 that is adapted to extend into the front opening of the oven liner 11 and serve somewhat as a plug member for closing the opening. Interposed between the edge of inner door panel 46 and the inner door liner 47 is a heavy belt-like gasket 49 of high thermal insulating material such as woven fiber glass or the like which serves both to break the thermal conductivity between the two elements as well as serves as a door sealing member bearing against the front edge or lip of the oven liner 11. This door structure is illustrated in detail in the patent to Clarence Getman No. 3,189,020, which is assigned to the assignee of the present invention.

Mention will now be made of the means of supporting the oven liner 11 in the outer oven body 22. As seen in FIGURE 1, the front wall of the oven body is provided with a large rectangular opening 51 that is framed by a rearwardly turned converging flange 52. The front edge of the oven liner is formed with an outwardly turned flange or lip 53 which is doubled over on itself as at 54 and extended rearwardly as at 55 as best seen in the cut-away section of FIGURE 4. Thus, the front flange 53 of the oven liner is a reinforced flange that is capable of withstanding high tensile stresses that are imposed upon the oven liner by mounting means arranged at the rear of the oven of FIGURE 1. This tension force is provided by the cooperation between a J-bolt 57 and a bracket member 58 that is fixed to the back of each side wall 16 of the oven liner for engagement by the J-bolts. Tension is applied to the bolt by means of a nut 59 assembled on each bolt, and this tension force pulls the oven liner into the oven body until stability is obtained and the oven liner is immovable during handling and shipment, as well as during the use of the oven in cooking or cleaning. This mounting technique is quite similar to the method of supporting the oven liner in standard ovens, however, it is not the only method of pulling on the back portion of the oven liner.

Turning attention to FIGURE 2, a mullion heater 60 in the form of a flattened metal sheathed resistance heating element is wound around the front of the oven liner in a plane that is spaced slightly rearwardly from the peripheral edge 52 of the opening 51 in the front wall of the oven body. This mullion heater 60 has a large surface area in engagement with the oven liner so as to transfer much of its heat into the oven liner.

The mullion heater 60 is for replenishing the heat lost through and around the oven door 12 and is primarily to insure that the door gasket 49 and inner door liner 47 will be cleaned during a heat cleaning cycle. Otherwise thermal shock might cause crazing or cracking of the procelain enamel that covers the inner surface of the oven cavity. This mullion heater 60 is held in place by a roll formed strap 61 at each of the four sides of the oven liner which is generally of flattened Z-shape in transverse cross-section and has a top flange 62 overlying the mullion heater, an inclined flange 63 extending down the rear side of the mullion heater and a bottom flange 64 which is adapted to be fastened, as by welding, to the outer surface of the oven liner. Notice that the mullion heater 60 is positioned in contact over the rearward extention 55 of the doubled-over portion of the front flange 53 of the oven liner. This serves as one heat path from the mullion heater to the front of the oven liner. A second heat path is rearwardly from the mullion heater through the strap 61 so that not all of the heat goes toward the front opening of the oven liner, but some is pulled back toward the interior.

The thermal breaking means of the present invention comprises a plurality of cylindrical spacers 65 which are made of crystallized glass containing at least 50% crystallinity by weight such as is sold under the tradename Pyroceram by the Corning Glass Works of Corning, N.Y. The material of these spacers should have a high mechanical strength, high thermal shock resistance and a low coefficient of thermal expansion. Pyroceram has been used widely in the cooking art for making cooking utensils such as coffee pots, pans and hot plates. This crystallized glass material is particularly high in resistance to compressive forces as it is capable of withstanding compression forces up to 220,000 p.s.i. In order to facilitate the ease of applying these spacers to the oven liner, each spacer is provided with a longitudinal hole 66 through the center thereof and a tie member such as wire 67 is threaded through the spacers and the ends of the tie member are twisted together as at 69 so as to locate the spacers directly behind the front flange 53 of the oven liner.

These spacers are widely separated from each other and some means should be provided to hold them apart along the length of the wire. This may be accomplished as seen in FIGURE 3 by using a sleeve 72 interposed between each two adjacent spacers 65. Such a sleeve 72 may be of high thermal insulating material such as fiber glass or the like and serves as a gasket member to close the gap between the front flange 53 of the oven liner and the peripheral edge 52 of the front opening of the oven body as well as between two adjacent spacers 65, 65.

An alternative would be to use a sleeve 72 of low thermal resistance such as polyethylene so that it is expendable. Such a polyethylene sleeve would serve to separate the spacers 65 from each other during the assembly of the thermal breaking means to the oven liner in the factory. However, once a high temperature cycle of the oven were run and the polyethylene were to reach a temperature of about 200° F. it would sublime and be transformed directly from a solid to a gaseous state. It will be understood that once the oven liner is mounted in the oven body by the tension means at the rear of the oven the polyethylene sleeves 72 are no longer needed as separators since the spacers 65 are already held in place.

Modifications of this invention will occur to those skilled in this art; therefore, it is to be understood that this invention is not limited to the particular embodiments disclosed, but that it is intended to cover all modifications which are within the true spirit and scope of this invention as claimed.

What I claim as new and desire to secure by Letters Patent of the United States is:

1. An oven construction comprising an outer oven body surrounding a box-like oven liner that has a front-opening door forming an oven cooking cavity, a layer of thermal insulating material surrounding the oven liner, the oven body having a front opening for receiving the oven liner therethrough, the front edge of the oven liner having an outwardly turned flange, tension means connected between the rear of the oven body and the rear of the oven liner for holding the oven liner in the oven body with the front flange of the oven liner being opposed to the peripheral edge of the said front opening of the oven body, a thermal breaking means mounted in direct contact between the peripheral edge of the front opening of the oven body and the front flange of the oven liner and compressed thereby, said breaking means comprising a plurality of widely separated ceramic spacers strung upon an endless tie member behind the front flange of the oven liner, said spacers having high mechanical strength, high thermal shock resistance and a low coefficient of thermal expansion.

2. An oven construction as recited in claim 1 wherein the said tie member supports a sleeve between adjacent ceramic spacers so as to facilitate the ease of locating the spacers along the extent of the tie member.

3. An oven construction as recited in claim 2 wherein the sleeves are of expendable plastic material which sublimates from a solid to a gaseous state at a relatively low temperature.

4. An oven construction as recited in claim 1 wherein the said tie member supports a sleeve of high thermal gasketing material between adjacent ceramic spacers for sealing the gap between the front flange of the oven liner and the peripheral edge of the front opening of the oven body.

5. An oven construction comprising an outer oven body having a cooking cavity formed by a box-like oven liner in cooperation with a front-opening access door, electric heating means for raising the cooking temperature within the cavity, a layer of thermal insulation surrounding the oven liner, the oven body having a front opening for receiving the oven liner therethrough, the front edge of the oven liner having an outwardly turned flange, tension means connected between the rear of the oven body and the rear of the oven liner for holding the oven liner in the oven body with the front flange of the oven liner being opposed to the peripheral edge of the front opening of the oven body, an electric mullion heater surrounding the oven liner in a plane slightly spaced rearwardly from the peripheral edge of the oven body, the front flange of the oven liner being doubled back on itself and extended rearwardly to be in heat transfer relationship with the said mullion heater, a thermal breaking means mounted in direct contact between the front flange of the oven liner and the peripheral edge of the front opening of the oven body and compressed thereby, said breaking means comprising a plurality of widely separated spacers of crystallized glass containing at least 50% crystallinity by weight, and a supporting member tying the spacers behind the front flange of the oven liner.

6. An oven construction as recited in claim 5 wherein the said spacers are each provided with a longitudinal opening, and there is a sleeve sandwiched between each adjacent pair of spacers, while the tie member is threaded through both the spacers and the sleeves and has its ends joined together as a permanent fastening means for the said thermal breaking means.

7. An oven construction as recited in claim 6 wherein the said sleeves are of high thermal insulating material such as fiber glass to serve as a gasket member in the gaps between adjacent spacers in the front flange of the oven liner and the peripheral edge of the front opening of the oven body.

8. An oven construction as recited in claim 6 wherein the said sleeves are of low thermal insulating materials such as polyethylene so that they sublime at operating temperatures of about 200° F. and are transformed from a solid to a gaseous state after the construction of the oven is complete.

References Cited

UNITED STATES PATENTS

| | | | |
|---|---|---|---|
| 3,017,488 | 1/1962 | Newell | 219—406 |
| 3,066,212 | 11/1962 | Hurko | 219—399 |
| 3,121,158 | 2/1964 | Hurko | 219—397 |
| 3,125,659 | 3/1964 | Welch | 219—398 |
| 3,189,375 | 6/1965 | Getman | 292—113 |
| 3,270,183 | 8/1966 | Gordan | 219—398 |

VOLODYMYR Y. MAYEWSKY, Primary Examiner.

U.S. Cl. X.R.

126—19, 273; 219—395, 407